United States Patent
Hofmann et al.

(10) Patent No.: US 11,754,083 B2
(45) Date of Patent: Sep. 12, 2023

(54) MOTOR FOR FANS OR BLOWERS, PUMPS OR COMPRESSORS, METHOD FOR OPERATING SUCH A MOTOR AND BLOWER SYSTEM HAVING ONE OR MORE MOTOR(S)/BLOWER(S)

(71) Applicant: ZIEHL-ABEGG SE, Kunzelsau (DE)

(72) Inventors: Sven Hofmann, Gaisbach (DE); Ruben Kollmar, Zweiflingen (DE)

(73) Assignee: ZIEHL-ABEGG SE, Kunzelsau (DE)

( * ) Notice: Subject to any disclaimer, the term of this patent is extended or adjusted under 35 U.S.C. 154(b) by 603 days.

(21) Appl. No.: 15/764,539

(22) PCT Filed: Sep. 20, 2016

(86) PCT No.: PCT/DE2016/200439
§ 371 (c)(1),
(2) Date: Mar. 29, 2018

(87) PCT Pub. No.: WO2017/054814
PCT Pub. Date: Apr. 6, 2017

(65) Prior Publication Data
US 2018/0274547 A1    Sep. 27, 2018

(30) Foreign Application Priority Data

Oct. 2, 2015    (DE) .................... 10 2015 219 150.8

(51) Int. Cl.
*F04B 1/0404*    (2020.01)
*F04B 17/03*    (2006.01)
(Continued)

(52) U.S. Cl.
CPC .......... *F04D 27/004* (2013.01); *F04B 1/0404* (2013.01); *F04B 17/03* (2013.01);
(Continued)

(58) Field of Classification Search
CPC ........ F04D 27/004; F04D 25/06; F04D 25/08; F04D 25/166; F04D 27/001;
(Continued)

(56) References Cited

U.S. PATENT DOCUMENTS

| | | | |
|---|---|---|---|
| 8,856,413 B2 * | 10/2014 | Schultz ................. | H04L 12/403 710/104 |
| 2003/0198564 A1 * | 10/2003 | Gatley, Jr. ............... | F04D 25/06 417/423.14 |

(Continued)

FOREIGN PATENT DOCUMENTS

| | | | |
|---|---|---|---|
| DE | 102012020460 B4 * | 11/2014 | ............. F04D 17/12 |
| GB | 2 328 737 | 3/1999 | |

(Continued)

OTHER PUBLICATIONS

Espacenet, Machine Translation of Dehen DE 10 2012 020 460, (obtained from http://translationportal.epo.org) (Year: 2021).*

(Continued)

*Primary Examiner* — Essama Omgba
*Assistant Examiner* — Geoffrey S Lee
(74) *Attorney, Agent, or Firm* — Wenderoth, Lind & Ponack, L.L.P.

(57) ABSTRACT

A motor for a fan, a ventilator, a pump or a compressor includes integrated motor electronics and at least one sensor unit for pressure or volume flow control. The at least one sensor unit may be a module that can be plugged onto or into the integrated motor electronics or may be at least partly integrated into the motor electronics. The motor may be an electronically commutated motor. The integrated motor electronics may be configured to supply the at least one sensor unit with energy.

18 Claims, 9 Drawing Sheets

(51) Int. Cl.
| | |
|---|---|
| *H02K 11/20* | (2016.01) |
| *H02K 11/25* | (2016.01) |
| *F04D 25/06* | (2006.01) |
| *F04D 25/08* | (2006.01) |
| *F04D 25/16* | (2006.01) |
| *F24F 110/40* | (2018.01) |
| *F04D 27/00* | (2006.01) |
| *F24F 11/77* | (2018.01) |
| *H02K 11/33* | (2016.01) |
| *F24F 11/63* | (2018.01) |
| *F24F 110/30* | (2018.01) |

(52) U.S. Cl.
CPC ............. *F04D 25/06* (2013.01); *F04D 25/08* (2013.01); *F04D 25/166* (2013.01); *F24F 11/77* (2018.01); *H02K 11/20* (2016.01); *H02K 11/25* (2016.01); *H02K 11/33* (2016.01); *F24F 11/63* (2018.01); *F24F 2110/30* (2018.01); *F24F 2110/40* (2018.01)

(58) Field of Classification Search
CPC ............. F04D 25/0666; F04D 25/0606; F04D 13/0606; F04D 15/0245; F04D 15/0254; F04B 1/0404; F04B 17/03; F04B 2207/04; F04B 2207/041; F04B 2207/042; F04B 49/08; H02K 11/20; H02K 11/25; H02K 11/33; H02K 11/00; H02K 11/0094; H02K 11/30; F24F 11/77; F24F 11/63; F24F 2110/30; F24F 2110/40

USPC ............................................. 417/42; 318/645
See application file for complete search history.

(56) References Cited

U.S. PATENT DOCUMENTS

| | | | |
|---|---|---|---|
| 2009/0079281 A1* | 3/2009 | Best ..................... | H02K 5/225 310/71 |
| 2009/0134823 A1 | 5/2009 | Jeung | |
| 2009/0277622 A1* | 11/2009 | Nair ................... | H05K 7/20836 165/246 |
| 2015/0061634 A1* | 3/2015 | Eisenbeis ................ | H02H 9/04 323/299 |

FOREIGN PATENT DOCUMENTS

| | | | | |
|---|---|---|---|---|
| GB | 2 457 534 | | 8/2009 | |
| GB | 2538217 | A * | 11/2016 | ......... F04D 29/4213 |
| JP | 2009-196627 | | 9/2009 | |
| JP | 2013-542356 | | 11/2013 | |
| WO | 02/47947 | | 6/2002 | |
| WO | 2012/031105 | | 3/2012 | |

OTHER PUBLICATIONS

International Search Report dated Jan. 9, 2017 in International (PCT) Application No. PCT/DE2016/200439.
International Preliminary Report on Patentability and Written Opinion dated Apr. 3, 2018 in International (PCT) Application No. PCT/DE2016/200439.

* cited by examiner

MOTOR FOR FANS OR BLOWERS, PUMPS OR COMPRESSORS, METHOD FOR OPERATING SUCH A MOTOR AND BLOWER SYSTEM HAVING ONE OR MORE MOTOR(S)/BLOWER(S)

BACKGROUND OF THE INVENTION

1. Field of the Invention

The invention concerns a motor for fans or ventilators, pumps or compressors, in particular, an electronically commutated motor (EC motor), with integrated motor electronics and at least one sensor unit for direct or indirect pressure/volume flow control. It is essential that the sensor unit can be used as a pure measuring unit and transmits the pressure or pressure values to an external control system. The regulation/control can also be integrated.

Furthermore, the invention concerns a process for the operation of such a motor and a fan system with one, two or more such motors or fans.

2. Description of the Related Art

Motors or fans of the generic type are well-known from practice. Merely by way of example, reference is made to GB 2 512 043 A. From this publication, a ventilation system with corresponding fans is known, in which an air volume measurement takes place in the housing. The relevant electronics is located in the housing, but outside the motor, and is also supplied with current/voltage from outside the motor. There is no provision for an integrated regulation. With regard to the data transmission of setpoint and actual values, the known system is complex, since no bus connection is provided.

Nowadays, speed-controlled fans with electronically commutated motors (EC fans) are used in modern air-conditioning units. They serve as a supply air/air extraction fan. In order to control the air volume as required, it is necessary to measure the air pressure and, if necessary, the temperature at different points in the air handling unit. Pressure and differential pressure sensors are used regularly. The output signal of the differential pressure sensor is usually fed to a separate control unit and processed there. The control unit calculates a speed setpoint and transmits it, for example, via an analog signal (e. g. 0 to 10 volts) or via a bus system (e. G. via a Modbus) to a higher-level controller/control system or to the fan. The pressure sensor, control unit, power supply and fan must be mounted in or on the air conditioner and wired together. This requirement is, however, costly in terms of time.

SUMMARY OF THE INVENTION

The invention is based on the task of designing and developing a motor of the generic type in such a way that it is particularly suitable for the driving fans, pumps, compressors, etc., with the least possible effort in switching and control engineering.

The foregoing task is solved by the fact that the sensor unit is designed as a module that can be plugged onto the motor electronics or plugged into the motor electronics, or at least partially integrated into the motor electronics and is supplied with energy via the motor electronics, i. e. internally.

A process in accordance with the invention serves to operate a motor in accordance with the invention, using a special control algorithm.

A fan system according to the invention comprises at least one motor or fan according to the invention.

It is essential for the invention-oriented motor, fan or ventilator that the sensor unit, comprising the sensor and the required electronics of the sensor, is either pluggable as a module onto the motor electronics or pluggable into the motor electronics. Alternatively, the sensor unit is completely integrated into the motor electronics. In both cases, the sensor unit is supplied with electrical energy via the motor electronics and the sensor unit is directly connected to the motor electronics.

In the first variant, i. e. when designing the sensor unit as a plug-in or plug-in module, corresponding motors or fans can be retrofitted. In addition, all known motor technologies are possible, such as asynchronous motors, permanent magnet synchronous motors, synchronous reluctance motors, etc.

In the following, the invention is described using the example of a centrifugal fan, whereby the description serves as an example for the discussion of the teaching in accordance with the invention, but does not restrict this to one fan type. Other fan types such as axial/diagonal fans are also possible.

As already explained, the term "sensor unit" is to be understood in the broadest sense. It comprises the actual sensor and, for example, a printed circuit board with electronic components.

The sensor unit can be the only sensor to include a pressure sensor that detects a local pressure via at least one hose or a pressure difference of the pressure at two locations via two hoses. An analog or digital signal corresponding to the pressure or pressure difference is fed to a microprocessor, which can be an integral part of the sensor unit.

Furthermore, it is conceivable that the sensor unit may also include other sensors that are connected to the sensor unit and whose measured values can be read in. It is also conceivable that additional internal or external sensor units equipped with corresponding sensors may be provided.

In any case, it is essential that the hose (pressure hose) or the hoses (at differential pressure) are connected directly to the motor/fan. The integrated sensor unit records the pressure and transmits a measured value corresponding to this pressure via an analog or digital signal to a microprocessor system. As an option, further measured variables can be determined via external sensors and their measured values can be transmitted to the sensor unit and read. Temperature sensors, humidity sensors, air quality sensors, etc. can be provided for this purpose.

The sensor unit communicates directly in an advantageous way with the motor controller unit via bus system. If several motors/fans are used, it is advantageous if an external, higher-level control is provided, which preferably sets a setpoint value via a bus system, e. g. via a Modbus. The higher-level control system is designed for data exchange with the integrated motor control and the sensor unit, among other things. It is also conceivable that the interface used for data exchange uses a method for the dynamic addressing of slave units, e. g. according to EP 2 287 689 B1. A common communication protocol with a uniform protocol set is a particular advantage.

The innovative process uses a control algorithm of a microprocessor system, taking into account a pre-set pressure setpoint and, if necessary, taking into account further setpoints for additional sensors. A speed setpoint value of the respective motor is calculated and the integrated motor electronics is controlled accordingly in such a way that a certain speed of the motor results.

As described above, the addressable unit can perform a pressure measurement, pressure control and, using the fan-dependent K-factor, a volumetric flow measurement or volume flow control.

Advantages of the invention-oriented technology can be seen in the fact that the sensor unit is supplied with voltage/current directly in the motor or fan. Accordingly, complex mounting and wiring of the sensor in the climate control unit is no longer necessary.

Hoses for pressure sensing are connected directly to the fan or to the pressure connections provided there, which are connected to the sensor unit.

If required, the fan can apply the pressure measurement, pressure control or also the volumetric flow measurement or volumetric flow control. An external control unit and its wiring can be omitted in such a design.

External power supplies of the pressure sensor are not required due to the internal power supply. In addition, only a Modbus address and a common bus description protocol are required, since the pressure sensor and motor or fan are integrated as one unit in a possibly external control system.

The sensor unit can be integrated in the motor electronics and connected to the micro-controller system of the motor.

An inventive fan system, in particular an air-conditioning unit, uses at least one motor/fan in accordance with the invention as described above. At the same time, a state-of-the-art motor/fan can be provided or combined with motors/fans in accordance with the invention.

BRIEF DESCRIPTION OF THE DRAWINGS

Various options exist for developing and extending the teaching of the current invention in an advantageous way. For this purpose, reference must be made to a preferred execution example of the invention on the basis of the drawings on the other. In conjunction with the detailed description of the preferred embodiment of the invention with reference to the drawings, also generally preferred improvements and further developments of the teaching are explained. The following is shown in the drawings:

FIG. 1a In a schematic view, a design example of a centrifugal fan according to the invention (with an inventive motor as drive), where an integrated differential pressure measurement is provided, FIG. 1b In a schematic view, enlarged, the object from FIG. 1a, FIG. 2 In a schematic view of the object from FIG. 1a, tilted against FIG. 1a, FIG. 3a In a schematic view of the object from FIG. 2, but with the lid open, which shows the sensor unit inserted in the motor electronics in a modular manner, FIG. 3b In a schematic view, enlarged, the motor electronics of the object from FIG. 3a, FIG. 4 In a schematic view, a pressure feed-through for connecting two external pressure hoses and for connecting the feed-through to the modular sensor unit, FIG. 5a In a schematic plan view, the sensor unit for insertion into the motor electronics with internal pressure hoses, and FIG. 5b In a schematic view of the object from FIG. 5a.

DETAILED DESCRIPTION OF THE INVENTION

Figure 1A:
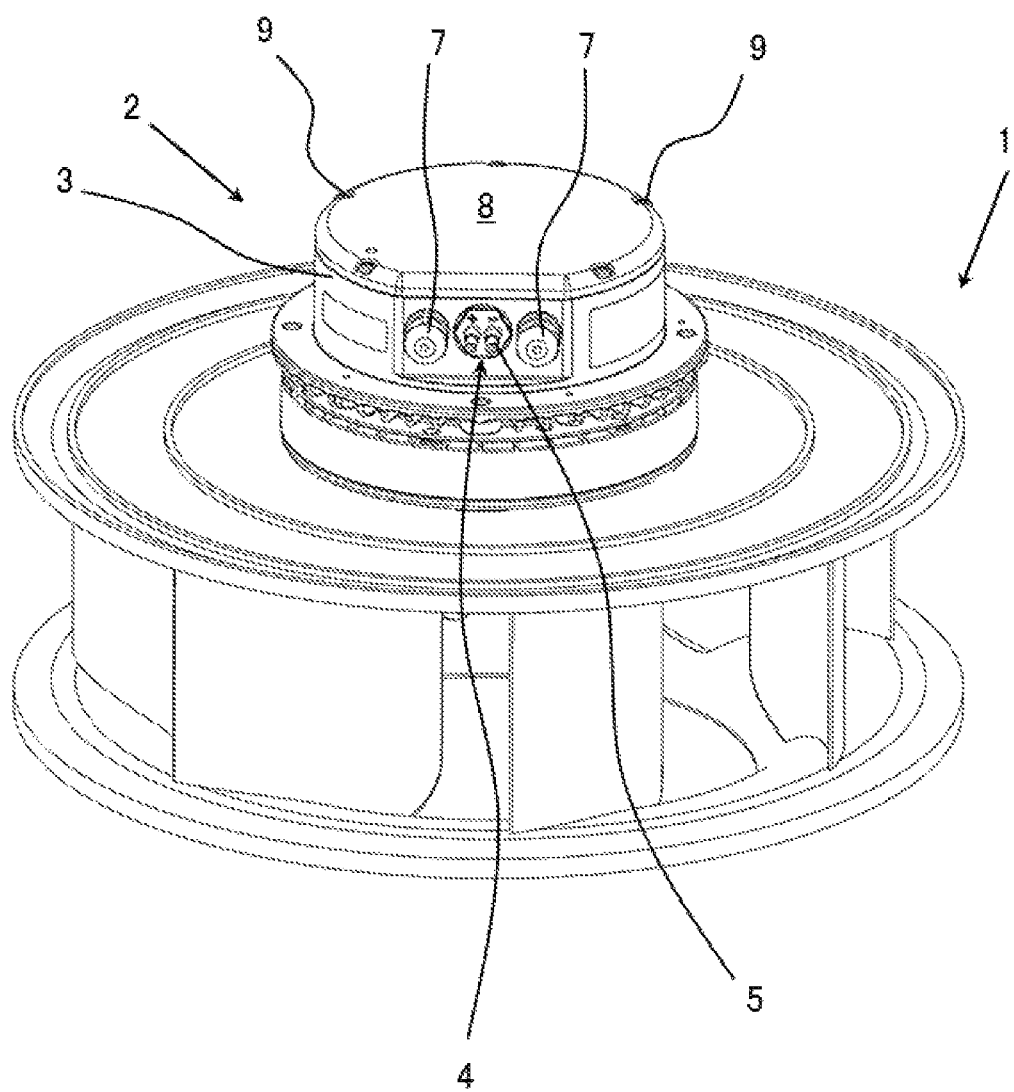

FIG. 1a shows an example of an application of the teaching according to the invention, namely a radial fan 1 with integrated differential pressure measurement. Motor 2, which includes the integrated differential pressure measurement, can be used to drive different fans or compressors.

FIG. 1a clearly shows a housing 3 for the motor electronics, whereby a pressure connection 4 with two nozzles 5 for external pressure hoses for differential pressure measurement are provided in housing 3. The pressure connection 4 is part of a passage 6 shown in FIG. 4, which is screwed into the housing 3. Electrical connections 7 are also provided.

Figure 1B:
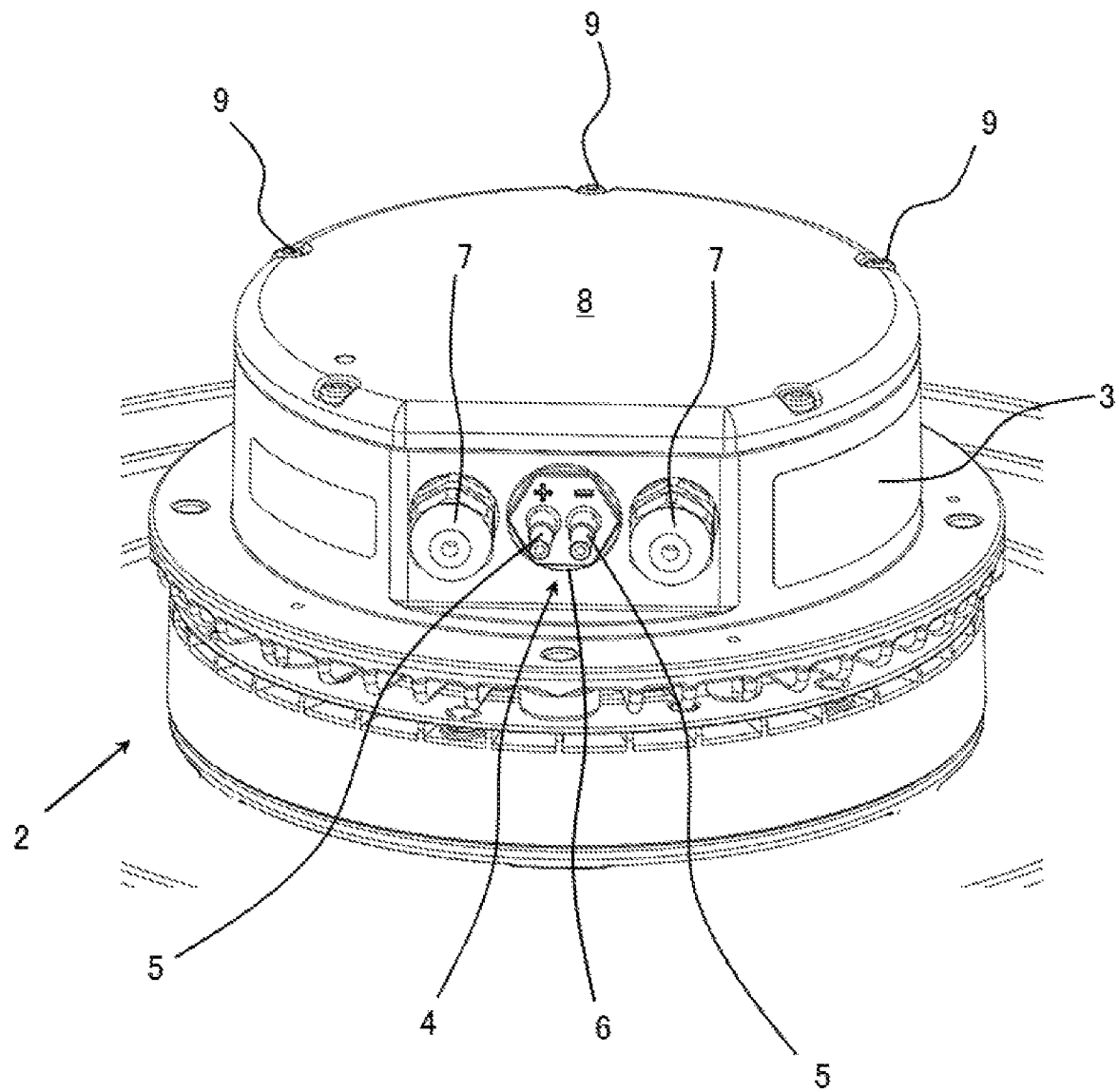

FIG. 1b shows the housing 3 of the centrifugal fan 1 from FIG. 1a in enlarged view. FIG. 1b clearly shows the pressure connection 4 with the two nozzles 5.

Figure 2:
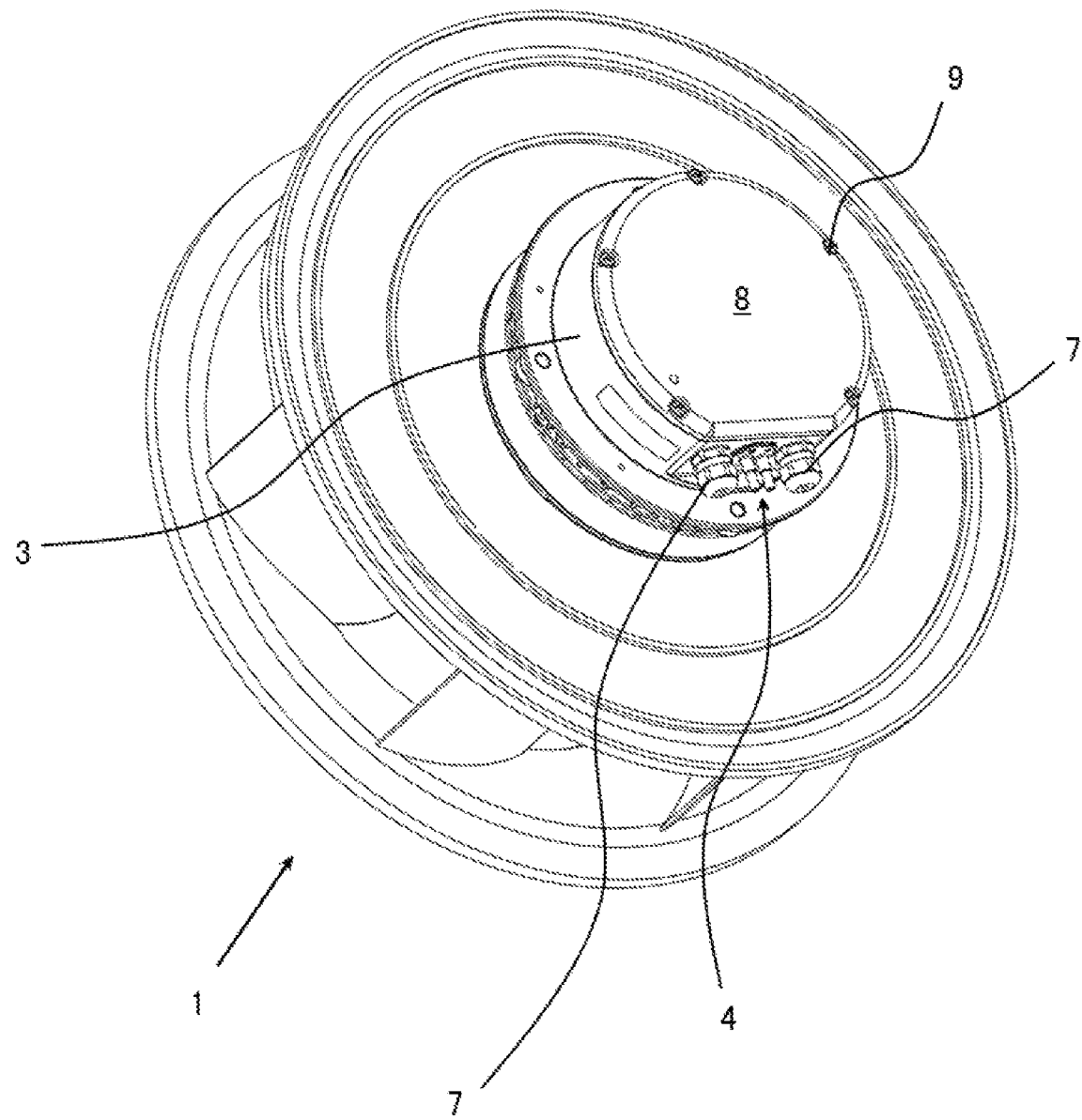

FIG. 2 shows the centrifugal fan shown in FIG. 1 in a tilted diagram with the components discussed above. The housing 3 has a cover 8, which is fastened to the housing 3 by means of screws 9.

Figure 3A:
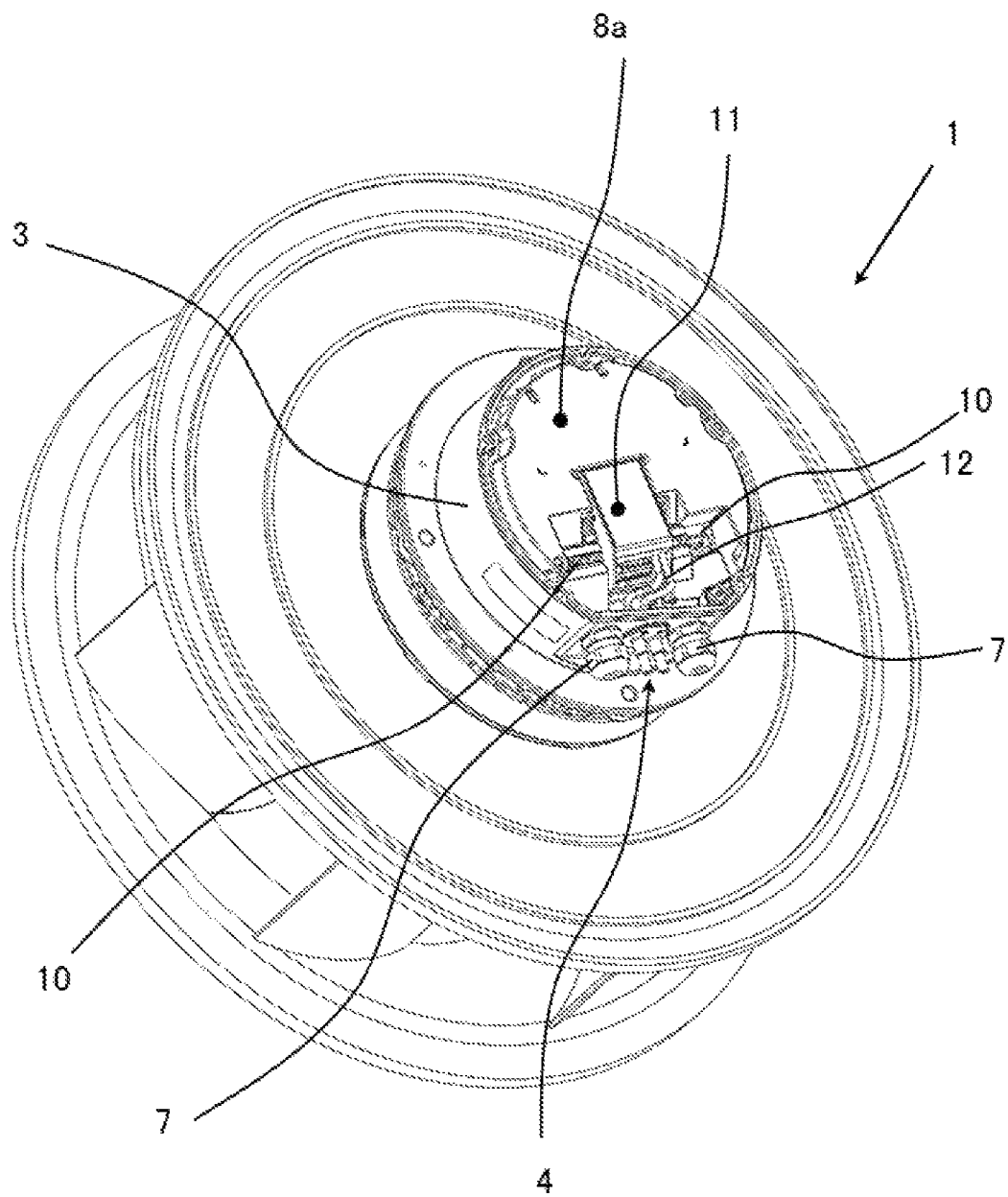
Figure 3B:
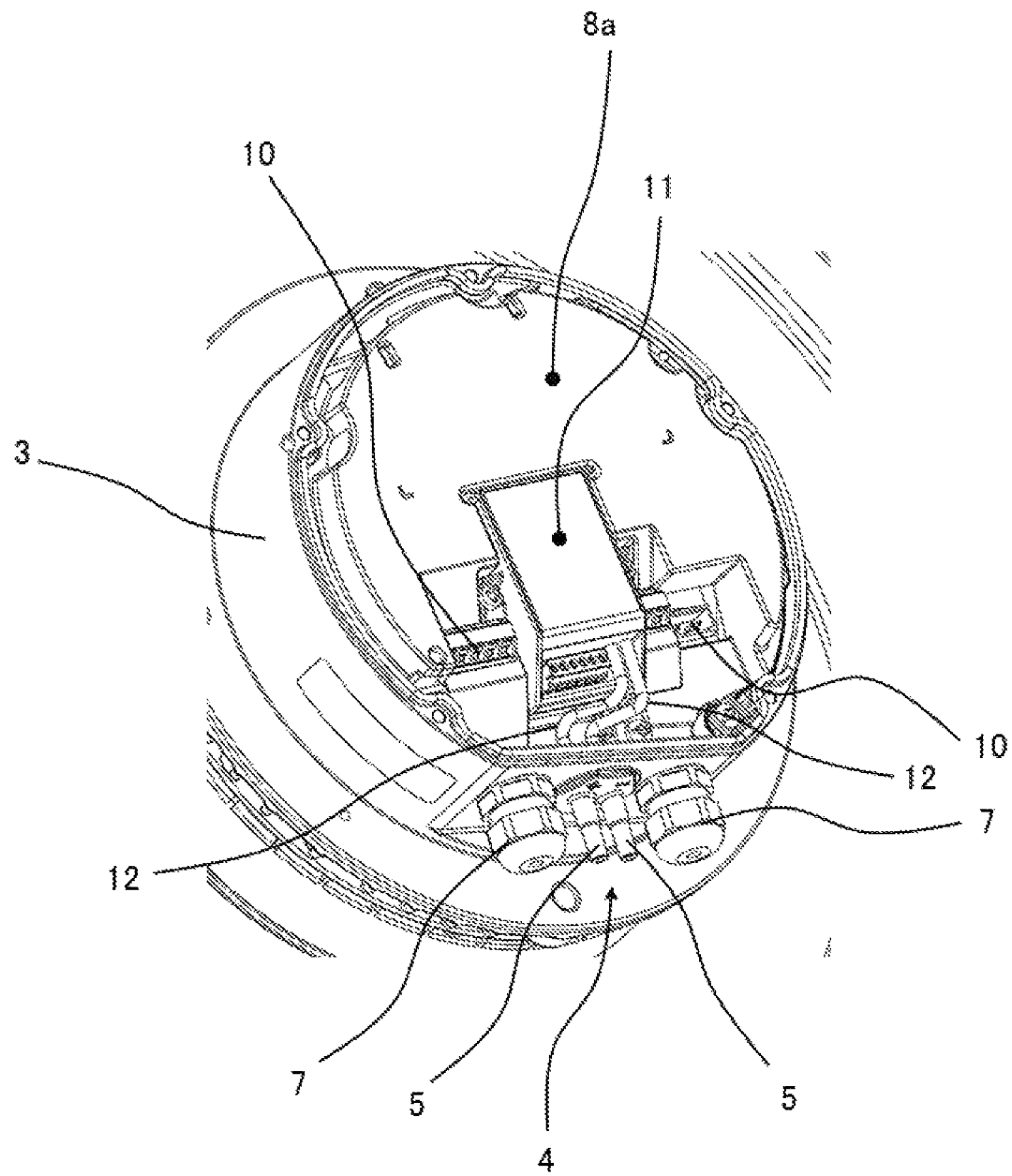

FIGS. 3a and 3b show the centrifugal fan 1 as shown in FIG. 2, but with open housing 3. The cover 8 not shown in FIGS. 3a and 3b has been removed after loosening the screws 9.

According to FIG. 3b, the motor electronics in the housing 3 is indicated, where only the terminals 10, which are part of the motor electronics, are visible. The actual motor electronics is covered by an inner cover 8a, which serves as a touch protection.

The modular sensor unit 11 is inserted into the motor electronics, in the area of a recess in the inner cover 8a, or inserted in/on the printed circuit board of the motor electronics and contacted there. The two internal hoses 12 are visible. They extend from the modular sensor unit 11 to passage 6 and can be connected from outside the housing 3 via the sockets 5 to external hoses which are not shown. Pressures from any location can be communicated to the sensor unit 11, i.e. by means of a flow connection created in this way.

Figure 4:
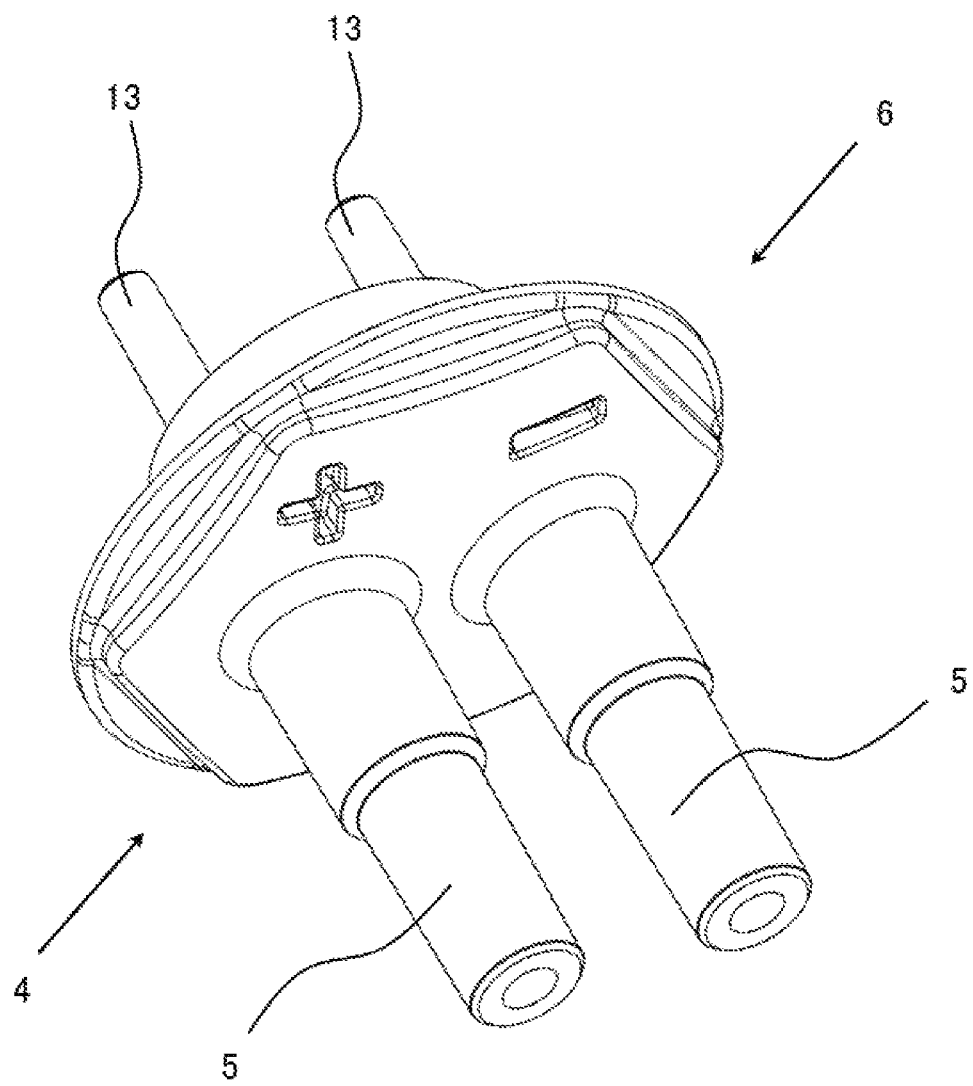

FIG. 4 shows a schematic view of passage 6 with internal connection piece 13, from which relatively thin hoses lead to sensor unit 11 (see FIG. 3b). The external connection pieces 5 are used to connect external pressure hoses in accordance with the previous versions.

Figure 5A:
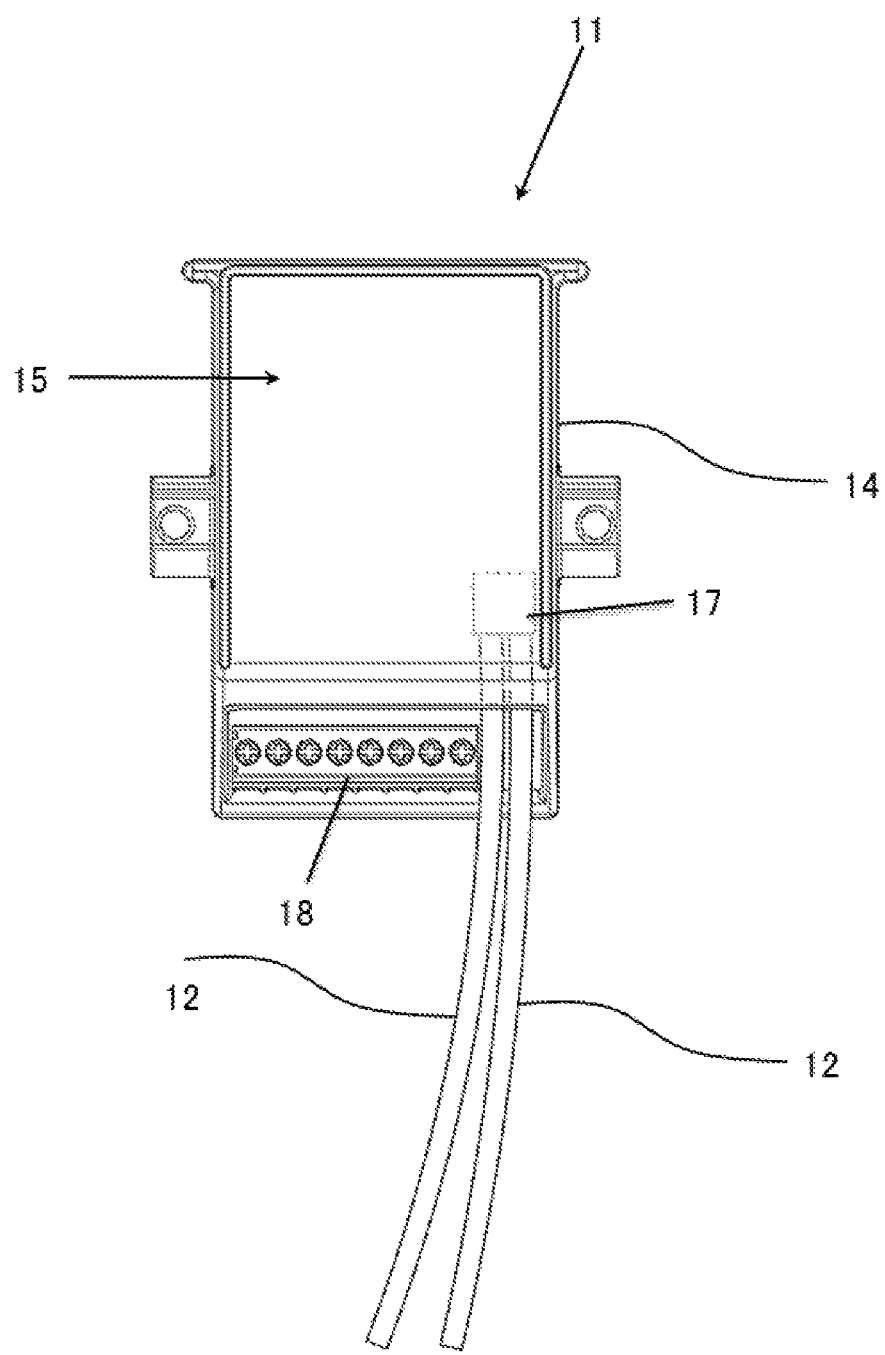

FIG. 5a shows the sensor unit 11 in a plan view, which is housed in a housing made preferably of plastic. In addition to other electronic components, the actual pressure sensor (17), which is connected to the internal hoses 12 by a flow, is located on a printed circuit board (PCB) 15.

Furthermore, connection terminals (18) are provided for (Modbus) communication with the outside world.

Figure 5B:
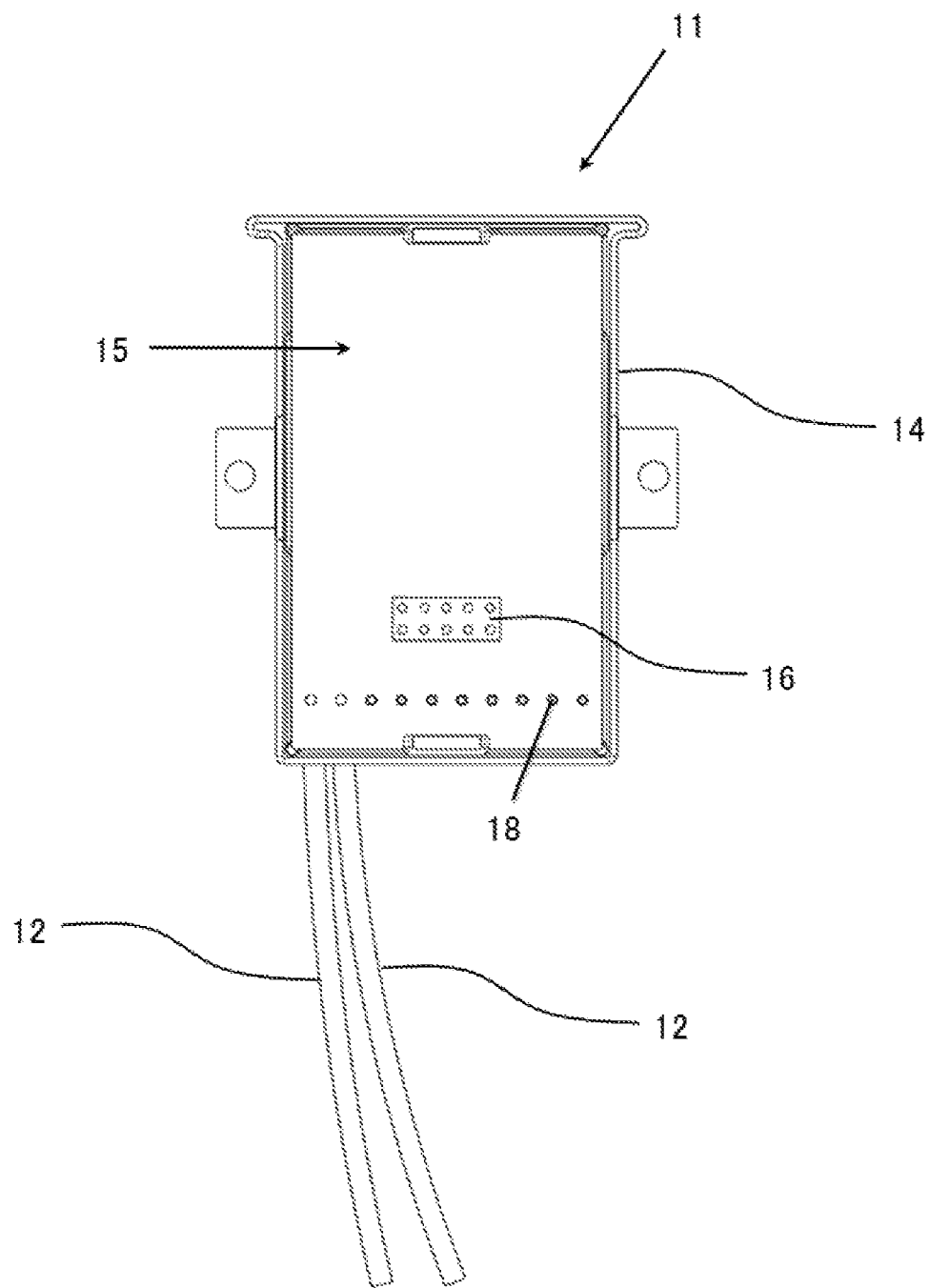

FIG. 5b shows the modular sensor unit 11 from below, i. e. in a lower view of the circuit board 15 provided there, which is provided with a contacting 16 for power supply directly from the main circuit board of the motor electronics and for the internal communication connection to the processor, etc.

Figure 6:
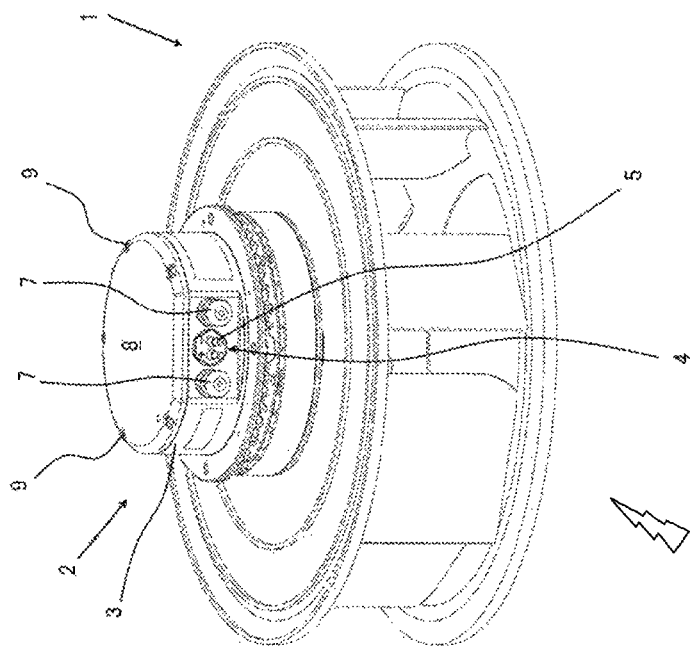
FIG. 6 In a schematic view, a design example of a fan system according to the invention including two centrifugal fans and a higher-level control system.
Figure 6:
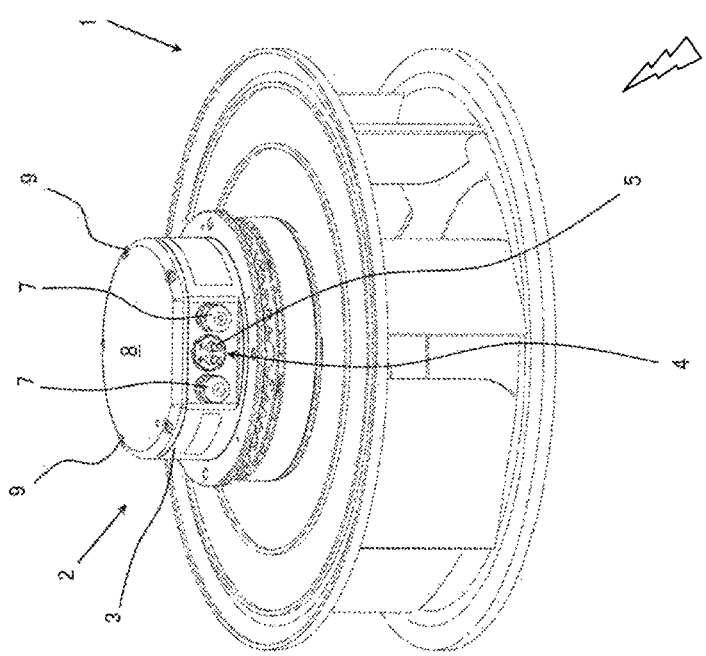

FIG. 6 shows two radial fans 1 and an external, higher-level control 19, which preferably sets a setpoint value via a bus system, e. g. via a Modbus. The higher-level control system 19 is designed for data exchange with the integrated motor control and the sensor unit 11 of each radial fan 1, among other things. It is also conceivable that the interface used for data exchange uses a method for the dynamic addressing of the radial fans 1 as slave units 1.

REFERENCE LIST

1 Radial fan
2 Motor
3 Housing (for motor electronics)
4 Pressure connection
5 Nozzle (outside)
6 Passage (in the housing wall)
7 Electrical connection
8 Outer cover
8a Inner cover (protective cover)
9 Screw
10 Connection terminals (part of the motor electronics)
11 Sensor unit
12 Hose (internal)
13 Nozzle (internal)
14 Plastic housing (the sensor unit)
15 Printed circuit board (sensor unit)
16 Contacts
17 Sensor, pressure sensor
18 Connection terminals (sensor unit)
19 Higher level control system

The invention claimed is:

1. A fan or ventilator, comprising:
a motor,
wherein the motor includes:
a control unit with integrated motor electronics;
at least one sensor unit for pressure control or volume flow control;
at least one internal pressure hose inside the motor; and
a passage,
wherein:
the at least one sensor unit is modular;
the at least one sensor unit is configured to be plugged into or onto a printed circuit board of the integrated motor electronics such that the at least one sensor unit is in contact with the printed circuit board of the integrated motor electronics;
the at least one sensor unit includes a pressure sensor;
the pressure sensor is configured to determine: (i) a local pressure via the at least one internal pressure hose or at least one external pressure hose outside the motor; or (ii) a pressure difference between a pressure at a first location in the at least one internal pressure hose or the at least one external pressure hose and a pressure at a second location in the at least one internal pressure hose or the at least one external pressure hose;
the pressure sensor is configured to feed a signal corresponding to the local pressure or the pressure difference to a processing unit; and
the at least one internal pressure hose extends from the at least one sensor unit to the passage and from the passage to at least one connection for the at least one external pressure hose.

2. The fan or ventilator according to claim 1, wherein:
the at least one internal pressure hose includes two internal pressure hoses inside the motor; and
the at least one external pressure hose includes two external pressure hoses outside the motor.

3. The fan or ventilator according to claim 1, wherein the at least one sensor unit includes an additional electronic component.

4. The fan or ventilator according to claim 1, wherein the at least one sensor unit includes a printed circuit board.

5. The fan or ventilator according to claim 1, wherein the at least one sensor unit includes at least one additional sensor.

6. The fan or ventilator according to claim 5, wherein the at least one additional sensor is configured to provide a measurement value with respect to at least one of temperature, humidity, or air quality.

7. The fan or ventilator according to claim 1, wherein the at least one sensor unit is configured to communicate directly with the control unit.

8. The fan or ventilator according to claim 1, further comprising an external control system configured to provide at least one setpoint value.

9. The fan or ventilator according to claim 8, wherein the external control system is configured to provide the at least one setpoint value via a bus system.

10. The fan or ventilator according to claim 8, wherein the external control system is configured to exchange data with the integrated motor electronics and the at least one sensor unit.

11. The fan or ventilator according to claim 10, further comprising an interface for data exchange which is configured to dynamically address at least one slave unit.

12. The fan or ventilator according to claim 10, wherein the fan or ventilator is configured to use a common communication protocol with a uniform protocol set.

13. The fan or ventilator according to claim 1, wherein the motor is an electronically commutated motor.

14. The fan or ventilator according to claim 1, wherein the integrated motor electronics are configured to supply energy to the at least one sensor unit.

15. A fan system including at least one fan or ventilator according to claim 1.

16. The fan system according to claim 15, further comprising at least one additional fan or ventilator.

17. The fan system according to claim 15, wherein the fan system is an air-conditioning box unit.

18. A fan or ventilator, comprising:
a motor,
wherein the motor includes:
a control unit with integrated motor electronics;
at least one sensor unit for pressure control or volume flow control;
at least one internal pressure hose inside the motor; and
a passage,
wherein:
the at least one sensor unit is at least partially integrated into the integrated motor electronics;
the at least one sensor unit includes a pressure sensor;
the pressure sensor is configured to determine: (i) a local pressure via the at least one internal pressure hose or at least one external pressure hose outside the motor; or (ii) a pressure difference between a pressure at a first location in the at least one internal pressure hose or the at least one external pressure hose and a pressure at a second location in the at least one internal pressure hose or the at least one external pressure hose;
the pressure sensor is configured to feed a signal corresponding to the local pressure or the pressure difference to a processing unit; and
the at least one internal pressure hose extends from the at least one sensor unit to the passage and from the passage to at least one connection for the at least one external pressure hose.

* * * * *